(12) United States Patent
Wylie (10) Patent No.: US 9,760,116 B2
(45) Date of Patent: Sep. 12, 2017

(54) DOCKING STATION FOR TABLET DEVICE

(71) Applicant: Mobile Tech, Inc., Hillsboro, OR (US)

(72) Inventor: Hunter Wylie, Hillsboro, OR (US)

(73) Assignee: Mobile Tech, Inc., Lake Oswego, OR (US)

( * ) Notice: Subject to any disclaimer, the term of this patent is extended or adjusted under 35 U.S.C. 154(b) by 0 days.

(21) Appl. No.: 14/097,171

(22) Filed: Dec. 4, 2013

(65) Prior Publication Data

US 2014/0168884 A1 Jun. 19, 2014

Related U.S. Application Data

(60) Provisional application No. 61/733,842, filed on Dec. 5, 2012.

(51) Int. Cl.
*G06F 1/16* (2006.01)

(52) U.S. Cl.
CPC .......... *G06F 1/1632* (2013.01); *G06F 1/1654* (2013.01)

(58) Field of Classification Search
CPC .............................. G06F 1/1632; G06F 1/1654
USPC .......................... 361/679.29, 679.41, 679.55
See application file for complete search history.

(56) References Cited

U.S. PATENT DOCUMENTS

| | | | | |
|---|---|---|---|---|
| 5,230,016 A * | 7/1993 | Yasuda | ........................ | 455/573 |
| 5,436,792 A * | 7/1995 | Leman et al. | ........... | 361/679.44 |
| 5,459,637 A * | 10/1995 | Ma et al. | ................. | 361/679.41 |
| 5,517,434 A * | 5/1996 | Hanson et al. | .......... | 361/679.41 |
| 5,570,267 A * | 10/1996 | Ma | ............................ | 361/679.21 |
| 5,583,742 A * | 12/1996 | Noda et al. | .............. | 361/679.21 |
| 5,586,002 A * | 12/1996 | Notarianni | ............... | 361/679.26 |
| 5,847,924 A * | 12/1998 | Youn | ........................ | 361/679.43 |
| 5,923,528 A * | 7/1999 | Lee | ........................ | F16M 11/04 248/291.1 |
| 6,400,560 B1 * | 6/2002 | Chian | ....................... | 361/679.27 |
| 6,504,710 B2 * | 1/2003 | Sutton et al. | ............. | 361/679.41 |
| 6,702,604 B1 * | 3/2004 | Moscovitch | .................. | 439/374 |
| 6,781,825 B2 * | 8/2004 | Shih et al. | ................ | 361/679.58 |
| 6,856,506 B2 * | 2/2005 | Doherty et al. | .......... | 361/679.27 |
| 6,935,883 B2 * | 8/2005 | Oddsen, Jr. | ................... | 439/374 |
| 6,952,343 B2 * | 10/2005 | Sato | ........................ | 361/679.57 |
| 7,052,296 B2 * | 5/2006 | Yang | ..................... | G06F 1/1626 439/165 |
| 7,352,567 B2 * | 4/2008 | Hotelling | ............... | G06F 1/1632 312/223.2 |
| 7,650,230 B1 * | 1/2010 | Laverick et al. | ............. | 701/491 |
| 7,652,873 B2 * | 1/2010 | Lee | ........................ | E05B 65/006 248/917 |
| D636,778 S * | 4/2011 | Corsini et al. | ............... | D14/434 |
| 8,208,245 B2 * | 6/2012 | Staats | ...................... | G06F 1/162 361/679.02 |
| 8,251,325 B2 * | 8/2012 | Molter | ...................... | 248/222.51 |
| 8,282,060 B2 * | 10/2012 | Fan | ............................ | 248/291.1 |
| D682,281 S * | 5/2013 | Barnard et al. | .............. | D14/447 |
| 8,467,178 B2 * | 6/2013 | Probst et al. | ............. | 361/679.27 |
| 8,531,829 B2 * | 9/2013 | Oberpriller et al. | ..... | 361/679.41 |

(Continued)

*Primary Examiner* — Adrian S Wilson
(74) *Attorney, Agent, or Firm* — Berkeley Law & Technology Group, LLP (57) ABSTRACT

A docking station for a tablet device includes a security frame that is releasably connected to a pedestal. An upper head portion of the pedestal is rotatable through three degrees of freedom to allow for angular adjustment of the frame as it retains a tablet device. Electrical conductivity is maintained through the rotational connection.

11 Claims, 7 Drawing Sheets

(56) References Cited

U.S. PATENT DOCUMENTS

| | | | | |
|---|---|---|---|---|
| 8,573,394 B2* | 11/2013 | Ahee et al. | | 206/320 |
| D696,259 S * | 12/2013 | Howarth | | D14/447 |
| 8,611,086 B1* | 12/2013 | Magnusson et al. | | 361/679.59 |
| 8,749,963 B2* | 6/2014 | Staats | | G06F 1/1632 248/121 |
| 8,780,548 B2* | 7/2014 | Lee | | G04G 17/086 361/679.41 |
| 8,800,763 B2* | 8/2014 | Hale | | 206/320 |
| 8,800,942 B2* | 8/2014 | Yu | | 248/122.1 |
| 8,851,565 B2* | 10/2014 | Hontz et al. | | 297/188.06 |
| 8,913,380 B2* | 12/2014 | Enomoto et al. | | 361/679.41 |
| 2002/0044406 A1 | 4/2002 | Shimoda et al. | | 361/679 |
| 2003/0137584 A1* | 7/2003 | Norvell et al. | | 348/61 |
| 2003/0222848 A1* | 12/2003 | Solomon et al. | | 345/156 |
| 2003/0235029 A1* | 12/2003 | Doherty | | G06F 1/1632 361/679.27 |
| 2004/0017652 A1* | 1/2004 | Billington et al. | | 361/686 |
| 2004/0230725 A1* | 11/2004 | Chen et al. | | 710/72 |
| 2004/0233631 A1* | 11/2004 | Lord | | 361/686 |
| 2005/0047104 A1* | 3/2005 | Grunow et al. | | 361/801 |
| 2005/0255895 A1* | 11/2005 | Lee et al. | | 455/573 |
| 2006/0061958 A1* | 3/2006 | Solomon et al. | | 361/686 |
| 2006/0067036 A1* | 3/2006 | Lin et al. | | 361/681 |
| 2006/0148575 A1* | 7/2006 | Vitito | | 463/46 |
| 2007/0152633 A1* | 7/2007 | Lee | | 320/114 |
| 2007/0247793 A1* | 10/2007 | Carnevali | | 361/681 |
| 2009/0080684 A1* | 3/2009 | Groset | | H04R 5/02 381/387 |
| 2009/0114556 A1* | 5/2009 | Tai et al. | | 206/320 |
| 2009/0303692 A1* | 12/2009 | Terlizzi | | 361/810 |
| 2010/0081337 A1* | 4/2010 | Dorogusker et al. | | 439/660 |
| 2010/0138581 A1* | 6/2010 | Bird et al. | | 710/303 |
| 2010/0172081 A1* | 7/2010 | Tian et al. | | 361/679.29 |
| 2010/0195279 A1* | 8/2010 | Michael | | 361/679.41 |
| 2011/0278885 A1* | 11/2011 | Procter | | B60R 11/0235 297/135 |
| 2012/0033375 A1* | 2/2012 | Madonna et al. | | 361/679.43 |
| 2012/0175474 A1* | 7/2012 | Barnard et al. | | 248/122.1 |
| 2012/0182680 A1* | 7/2012 | Wetzel | | F16M 11/105 361/679.06 |
| 2012/0188689 A1* | 7/2012 | Leung | | G06F 1/1632 361/679.01 |
| 2012/0189156 A1* | 7/2012 | Leung | | 381/387 |
| 2012/0293924 A1* | 11/2012 | Dolci et al. | | 361/679.01 |
| 2013/0026322 A1* | 1/2013 | Wheeler | | A47F 7/024 248/289.31 |
| 2013/0058023 A1* | 3/2013 | Supran | | G06F 1/1632 361/679.01 |
| 2014/0118930 A1* | 5/2014 | Sedon | | E05B 73/0082 361/679.56 |

\* cited by examiner

DOCKING STATION FOR TABLET DEVICE

This disclosure claims priority on provisional application filing 61/733,842. The contents of the provisional are incorporated here by reference.

TECHNICAL FIELD

The design disclosed below relates to a docking station for a tablet device. More particularly, the design relates to a docking station that allows the tablet device to be used as a work station, or alternatively, the tablet device can be undocked and used remotely from the work station position.

BACKGROUND OF THE INVENTION

In general terms, electronic tablet devices (or "tablets") have evolved such that they are now performing many of the functions that were formerly performed by laptop or desktop computers. The processing capability of tablets now allow them to perform standard business functions.

Because of their size and portability, one of the problems associated with the use of tablets in a business setting relates to physical security and/or theft of the device itself. The design disclosed here addresses these problems.

SUMMARY OF THE INVENTION

The following is a summary of the various improvements disclosed in this document.

The disclosed design is a docking station that is primarily intended to be used in connection with tablet devices. Tablet devices are well-known electronic devices. They are sometimes called electronic tablets, tablet computers, or just "tablets."

The docking station disclosed here includes a security frame portion for retaining the tablet. The security frame portion surrounds the tablet and provides a framework for carrying the tablet from place-to-place while retained within the security frame.

The frame portion carries or has a first universal adaptor that electrically couples the tablet to the frame portion. The universal adaptor is designed so that it may electrically couple to the different kinds of connection ports that relate to different brands of tablets. As a person skilled in the art would know, these connection ports provide a means for transmitting power and data to and from the tablet.

The docking station also includes a pedestal, or pedestal portion, that normally rests on a workstation surface or the like. The pedestal has a connecting head portion that provides a means for releasably connecting the above-described frame portion to the pedestal portion. The head portion carries a second universal adaptor for electrically coupling the head portion to the first universal adaptor on the frame portion, previously described, when the frame portion is connected or "docked" to the pedestal portion.

Another feature of the design involves a rotational connection between the head portion of the pedestal and a lower base portion of the pedestal. The rotational connection enables three degrees of angular orientation or adjustment of the head portion relative to the base portion. This, in turn, allows for adjustment of the view angle of the tablet when it is docked.

The base portion is connectable to or provides electrical connection ports for at least one electrical signal, although preferably, it includes ports for numerous kinds of electrical connections that normally involve power and data. A conductor pathway is provided through the base member to the universal adaptor carried by the head portion by crossing the rotational connection between the head portion and the base portion. This allows electrical connectivity to be maintained regardless of the angular portion of the frame (and tablet) relative to the pedestal.

Another feature of the design involves locking the frame to the pedestal. While this may be accomplished in different ways, the design disclosed here includes an electronic lock for additional security The foregoing summary will become better understood upon review of the attached drawings which are to be taken in conjunction with the written description set forth below.

BRIEF DESCRIPTION OF THE DRAWINGS

In the drawings, like reference numerals and letters refer to like parts throughout the various views, and wherein.

DETAILED DESCRIPTION

Figure 1:
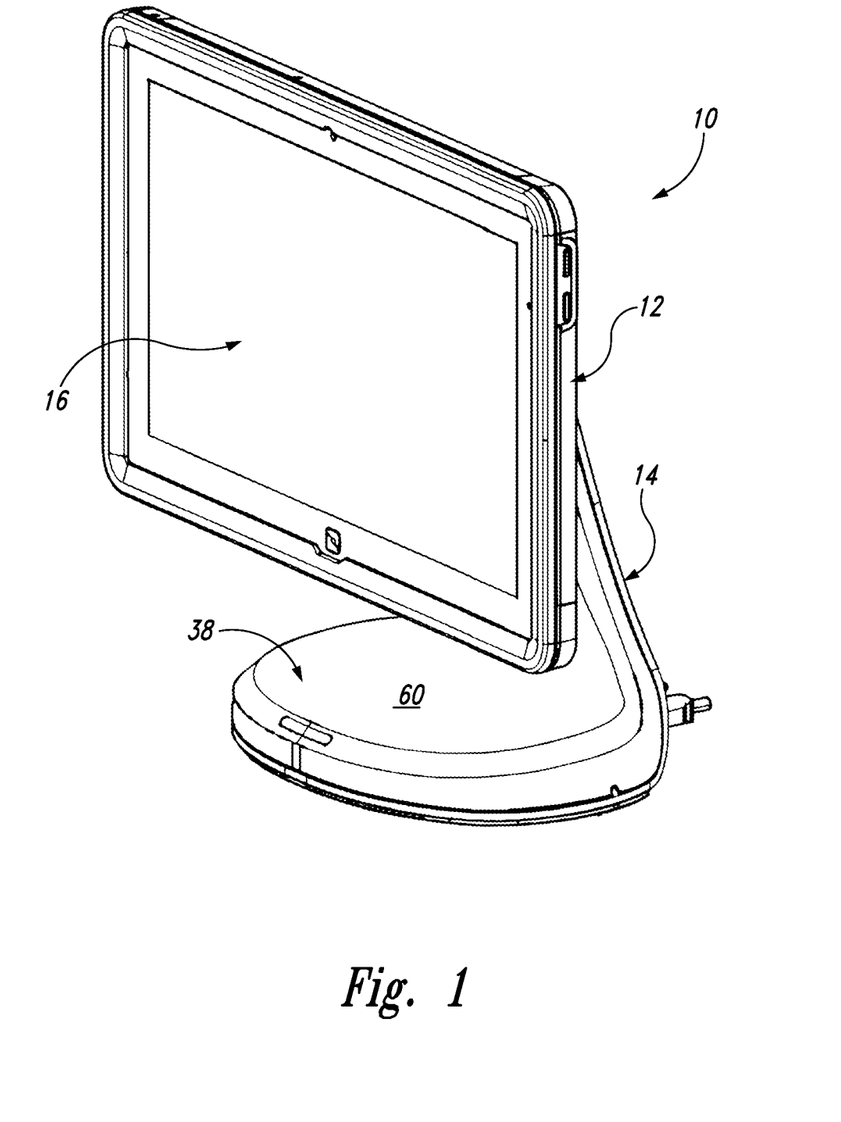
FIG. 1 is a perspective view of a docking station constructed in accordance with the patent claims.
Figure 2:
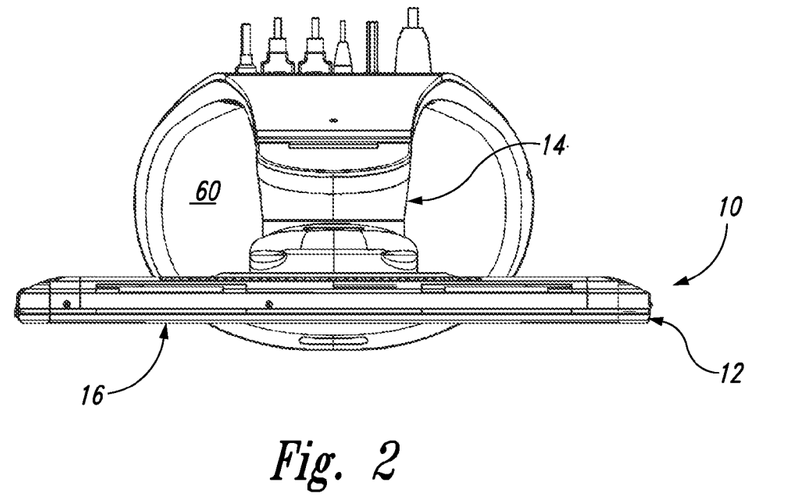
FIG. 2 is a top view of the docking station.
Figure 3:
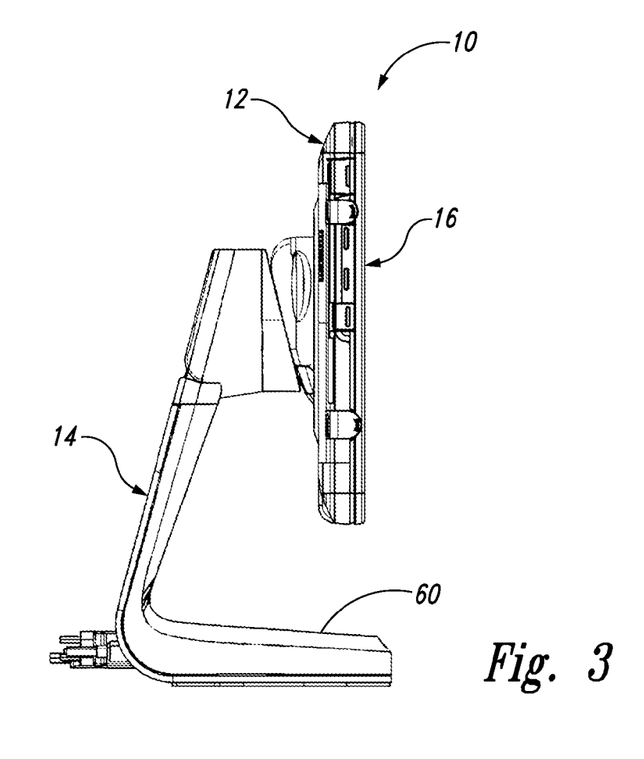
FIG. 3 is a side view of the docking station.

Referring now to the drawings, and first to FIG. 1, indicated generally at 10 is a docking station in accordance with the present disclosure. The docking station 10 includes a security frame portion, indicated generally at 12, and a pedestal portion, indicated generally at 14.

The pedestal portion 14 surrounds and captures a tablet device 16. The outline of the tablet's screen is indicated by dashed line 18 in FIG. 1. The activating button on the tablet is indicated at 20.

Although the frame 12 is illustrated here as surrounding and capturing the tablet 16, it is to be understood that there could be other physical embodiments that perform the same function without completely surrounding the entire or full periphery of the tablet 16.

Figures 4, 5, 6:
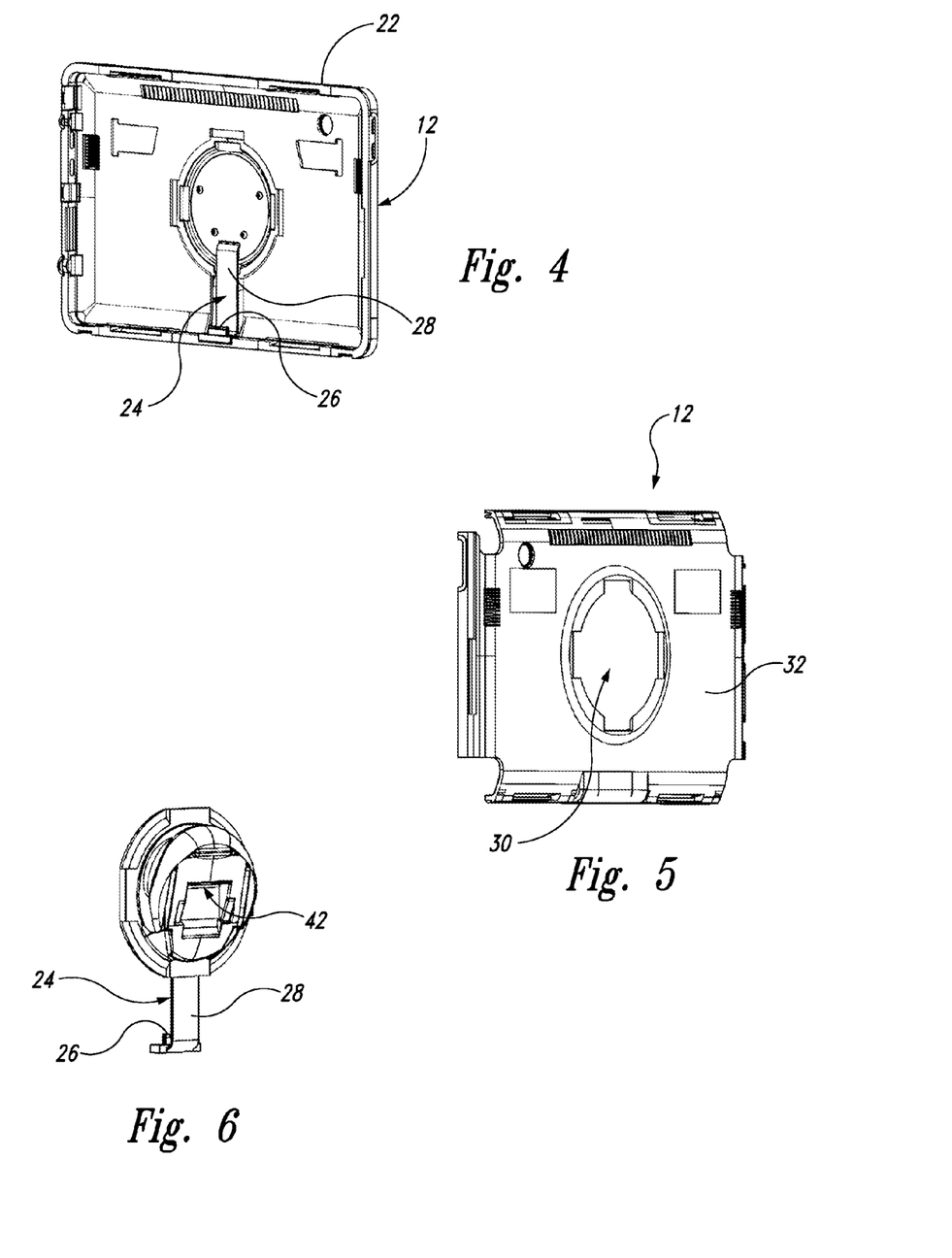
FIG. 4 is a perspective view of a security frame portion of the docking station that holds or retains a tablet.
FIG. 5 is a perspective view of a back-side part of the security frame portion illustrated in FIG. 4.
FIG. 6 is a perspective view of an adaptor portion of the security frame illustrated in FIG. 4.
Figure 7:
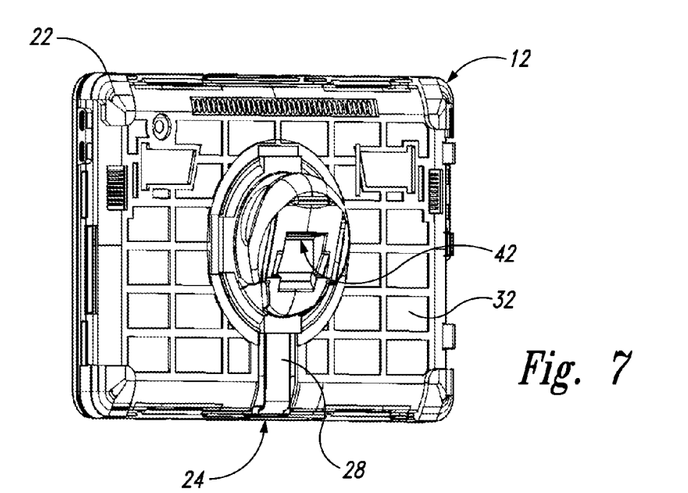
FIG. 7 is a perspective view of the back-side of the security frame portion illustrated in FIG. 4.

Referring now to FIGS. 4-7, further details of the frame portion 12 will now be described. FIG. 4 illustrates the frame portion 12 without the tablet inside (looking at the front). As can be seen from the Fig., it has a rectangular peripheral edge 22 that captures the edge of the tablet 16. Depending on the configuration, the edge structure 22 may be provided with built-in openings for different kinds of tablet access ports (for the purpose of pushing buttons on the tablet or accessing jacks, etc.).

The frame 12 carries a first electrical adaptor, indicated generally at 24 in FIGS. 4 and 6, that provides the needed electrical connection to the tablet 16. The adaptor 24 is "universal" in that it has a universal connector fitting 26 that would be shaped to fit a variety of different kinds of tablets (tablet variations are dictated by brand). Typically, and as a person skilled in the art would understand, the universal adaptor 24 provides power and data connections for the tablet—i.e., power for the device's battery, etc., and data for network or Internet connections, if hard-wired connections are desired. The conductors for the universal adaptor 24 run through a stem portion 28 (see FIG. 6 of the universal adaptor 24).

FIG. 5 illustrates the back-side or back plate 30 of the frame portion 12. It is surrounded by the edge 22 previously described. As is shown in FIG. 5, it has an opening 30 for capturing the universal adaptor 24 previously described. When all of these components are assembled together, it produces the frame portion of the docking station indicated in FIG. 4 (the front side) and FIG. 7 (the back side).

Figure 8:
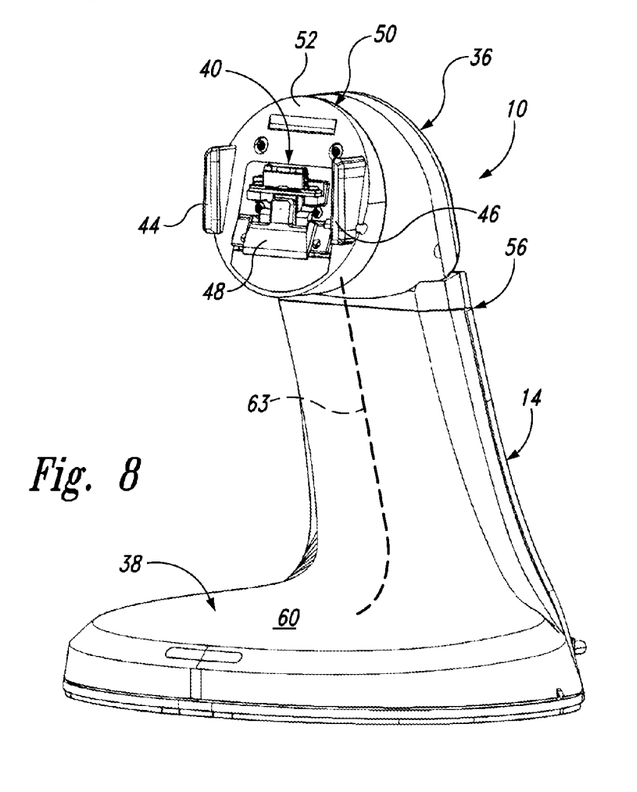
FIG. 8 is a perspective view of a pedestal portion of the docking station illustrated in FIG. 1.

Referring now to FIG. 8, reference numeral 14 generally indicates the pedestal portion of the docking station 10. The pedestal portion includes an upper head portion, indicated generally at 36, and a lower base portion, indicated generally at 38. The head portion 36 carries a second universal adaptor 40 that connects into a similar connector fitting in a recess of 42 of the first adaptor 24.

The first adaptor 24 releasably rests on protrusions 44, 46 on head portion 36. It has a conventional catch 48 that allows adaptor 24 (and therefore, frame 12) to be releasably connected to and from the pedestal portion 14 (via the head 36).

An advantage to the design is that the portion fitting 40 adjacent the front face 52 of head portion 36 creates a reliable interface connection point for engagement/disengagement of the first universal adaptor 24 (and frame portion 12) with the pedestal portion 14.

Figure 9:
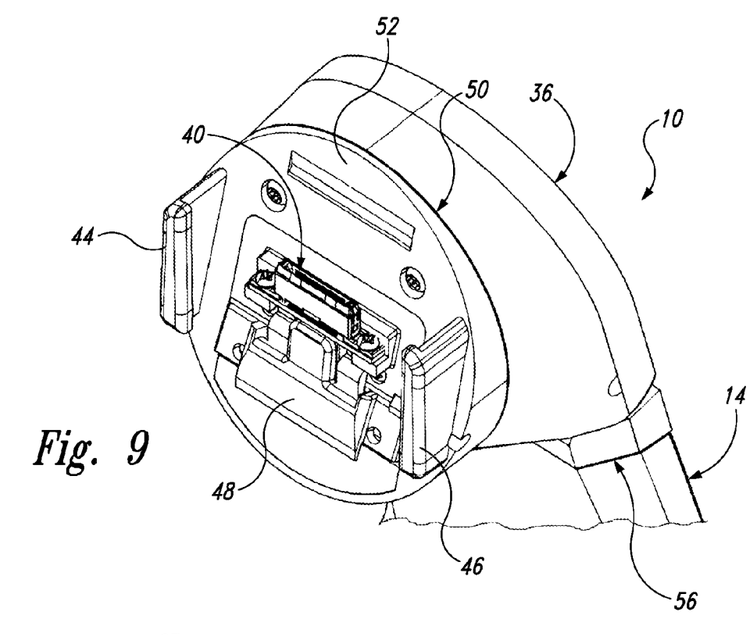
FIG. 9 is an enlarged view of the head of the pedestal portion illustrated in FIG. 8.

The head portion 36 is designed to rotate at three physical positions. The first position is indicated by arrow 50 in FIG. 9, which illustrates a circular rotation of the front face 52 of the head portion about an axis that would project normally out from face 52. When the frame portion 12 is mounted to the pedestal 14, this arrangement provides one degree of freedom of rotation that would allow the tablet 16 to be rotated between portrait and landscape orientations, if desired. Arrow 54 in FIG. 10 points to another area designed to allow the head 36 to rotate up or down to rotationally lift or lower the screen of the tablet for vertical positioning, as desired.

Figure 10:
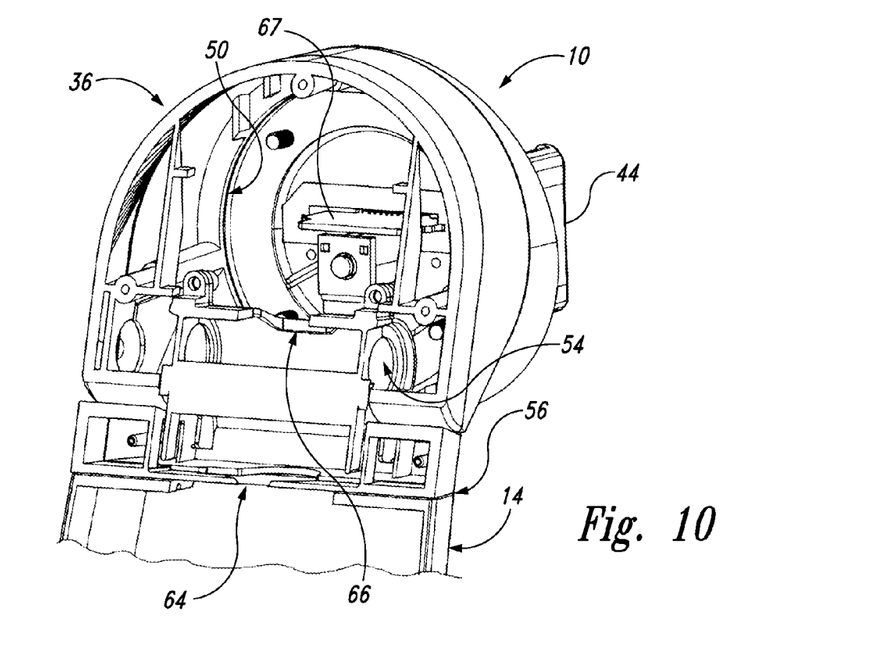
FIG. 10 is a view like FIG. 9, but is taken from the back-side perspective of the pedestal portion.

Finally, arrow 56 points to a last position for angularly rotating the head about a vertical or upright axis for angularly adjusting the tablet screen 16 from left-to-right, as desired.

Figure 12:
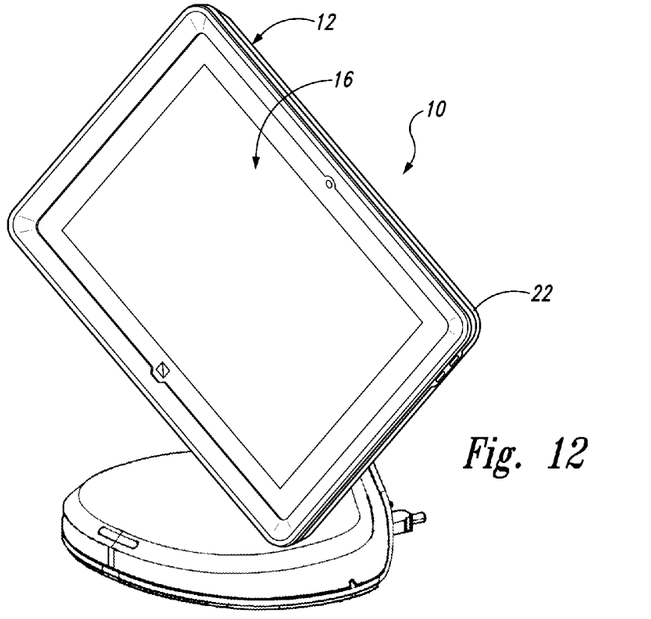
FIG. 12 is a perspective view of the docking station, showing angular rotation of the tablet device.
Figure 13:
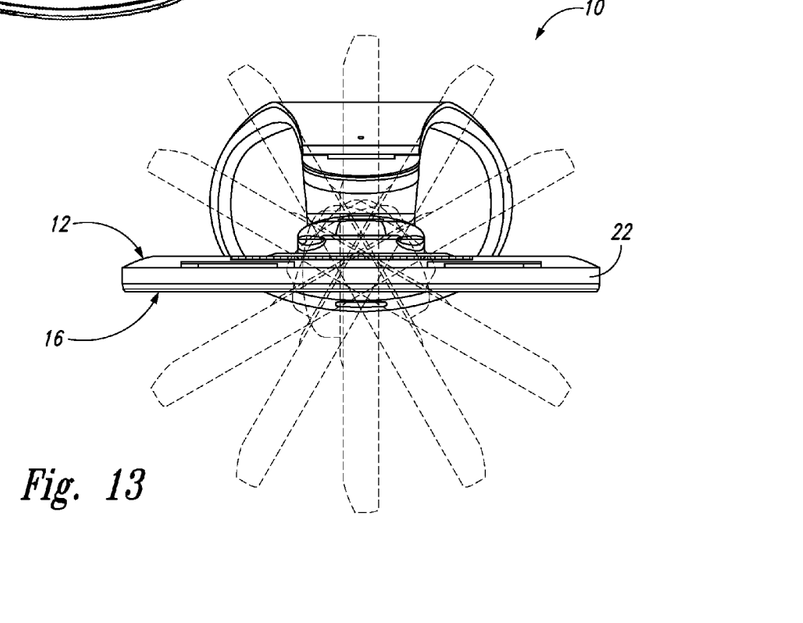
FIG. 13 is a top view of FIG. 12 and shows different rotational positions of the tablet device.

The physical structure of the above rotational connections can take different forms, using different types of pins or moldings that allow one part to rotate relative to another. In all cases, what is important about the design is that it allows three degrees of rotation without interfering with the wiring in the pedestal portion. FIGS. 12 and 13 illustrate different possible rotational positions.

Figure 11:
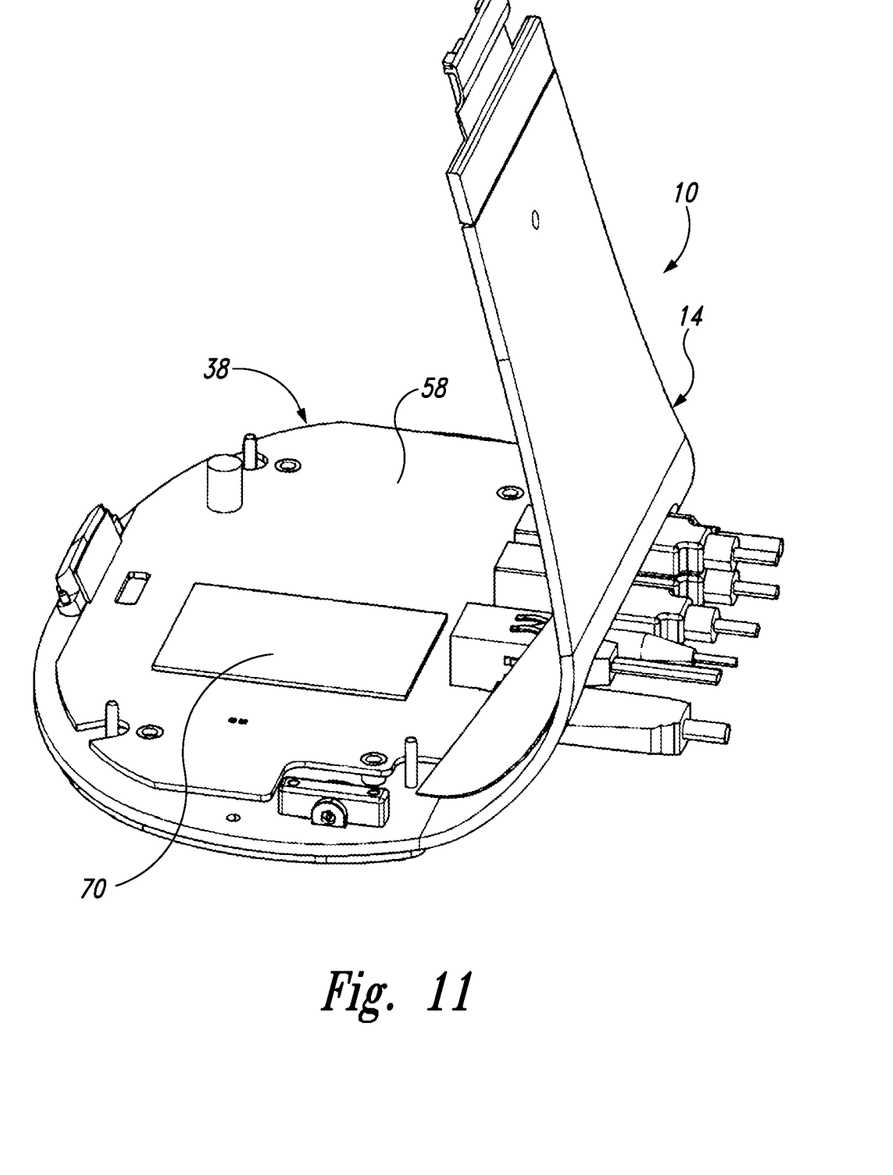
FIG. 11 is a view of the lower portion of the pedestal portion illustrated in FIG. 8, with a cover removed to reveal an electronics board.

In this last respect, FIG. 11 illustrates base portion 38 with its cover plate 60 removed, thus exposing an electronics control board (ECB) 58 inside the base portion. A series of electrical connector fittings (USB, etc.) are electrically connected to the ECB 58 for providing data or power. These electrical signals are passed, via wiring, or a wiring harness, up through the body of the pedestal 14, which is hollow. The position of the wiring is schematically indicated by dashed line 63 in FIG. 8.

Referring to FIG. 10, the pedestal 14 has openings 64, 66 that enable the wiring to pass through the head space, and through the physical zone of rotational connections described above. This allows rotation without stressing the wiring. The wiring connects to a board 67 upon which the second adaptor fitting 40 rests. The board 67 provides the wiring connections to the fitting 40.

Finally, the frame portion 12 could be releasably locked to the pedestal portion via a RFID lock if desired. The ECB 58 in the base portion has surface space for a RFID sensor 70 that could detect a wireless keycard, if desired. The sensor would activate locks on the head portion, upon detection of the keycard.

It is to be appreciated that the foregoing description sets forth the best known examples and embodiments. It is not intended that any of the foregoing description be used to limit the scope of the patent protection. Instead, all patent protection is to be defined solely by the patent claim or claims that follow this description, the interpretation of which is to be made according to the legal rules of patent claim interpretation and the rules and regulations of the U.S. Patent and Trademark Office.

What is claimed is:

1. A docking station for a tablet device, the docking station allowing for a three degree of rotation of the tablet device, comprising:
    a frame portion for retaining the tablet device, the frame portion surrounding the tablet device and carrying a first universal adaptor for electrically coupling the tablet device to the frame portion, the first universal adaptor being electronically coupleable to a variety of different types of tablet devices, the first universal adaptor having a first connector fitting for electrically coupling the first universal adaptor to the tablet device, and a second connector fitting positioned aft of the tablet device; and
    a pedestal portion for resting on a surface, the pedestal portion having a rotatable head portion for releasably connecting the frame portion to the pedestal portion via a locking structure disposed on a forward face of the rotatable head portion to enable the frame portion to be removed from the pedestal portion while retaining the tablet device, the rotatable head portion carrying a second universal adaptor arranged on the forward face of the rotatable head portion to create a detachable interface connection point for at least communicatively coupling the second universal adaptor to the second connector fitting of the first universal adaptor, aft of the tablet device and at a position adjacent to the forward face of the rotatable head portion, while the frame portion is releasably connected to the rotatable head portion.

2. A docking station for a tablet device, the docking station allowing for a three degree of rotation of the tablet device, comprising:
    a frame portion for retaining the tablet device, the frame portion surrounding the tablet device and carrying a first universal adaptor for electrically coupling the tablet device to the frame portion, the first universal adaptor being electronically coupleable to a variety of different types of tablet devices, the first universal adaptor having a first connector fitting for electrically coupling the first universal adaptor to the tablet device, and a second connector fitting positioned aft of the tablet device; and a pedestal portion for resting on a surface, the pedestal portion having a rotatable head portion for releasably connecting the frame portion to the pedestal portion via a locking structure disposed on a forward face of the rotatable head portion to enable the frame portion to be removed from the pedestal portion while retaining the tablet device, the rotatable head portion carrying a second universal adaptor arranged on the forward face of the rotatable head portion to create a detachable interface connection point for at least communicatively coupling the second universal adaptor to the second connector fitting of the first universal adaptor, aft of the tablet device and at a position adjacent to the forward face of the rotatable head portion, while the frame portion is connected to the rotatable head portion, at least one other rotational connection between the head portion and a base portion of the pedestal portion, so that the angular orientation of the head portion may be adjusted relative to the base portion, the base portion being connectable to at least one source for an electrical signal, and a conductor pathway through a base member, and then across at least one other rotational connection between the head portion and base portion, to the second universal adaptor.

3. The docking station of claim 1, wherein the rotatable head portion is releasably locked to the frame portion.

4. The docking station of claim 3, including an electronics control board ("ECB") received within the pedestal portion of the docking station, the ECB carrying an RFID sensor that is operable to detect a wireless keycard, and wherein, the RFID sensor activates the releasable lock upon detection of the keycard.

5. The docking station of claim 1, wherein the rotatable head portion is releasably locked to the frame portion by an RFID lock.

6. The docking station of claim 5, including an electronics control board ("ECB") received within the pedestal portion of the docking station, the ECB carrying an RFID sensor that is operable to detect a wireless keycard, and wherein, the RFID sensor activates the releasable lock upon detection of the keycard.

7. The docking station of claim 2, wherein the rotatable head portion is releasably locked to the frame portion.

8. The docking station of claim 7, including an electronics control board ("ECB") received within the pedestal portion of the docking station, the ECB carrying an RFID sensor that is operable to detect a wireless keycard, and wherein, the RFID sensor activates the releasable lock upon detection of the keycard.

9. The docking station of claim 2, wherein the rotatable head portion is releasably locked to the frame portion by an RFID lock.

10. The docking station of claim 9, including an electronics control board ("ECB") received within the pedestal portion of the docking station, the ECB carrying an RFID sensor that is operable to detect a wireless keycard, and wherein, the RFID sensor activates the releasable lock upon detection of the keycard.

11. A docking station for a tablet device, the docking station allowing for a three degree of rotation of the tablet device, comprising:

a frame portion for retaining the tablet device, the frame portion surrounding the tablet device and carrying a first universal adaptor for electrically coupling the tablet device to the frame portion, the first universal adaptor being electronically coupleable to a variety of different types of different tablet devices, the first universal adaptor having a first connector fitting for electrically coupling the first universal adaptor to the tablet device, and a second connector fitting positioned aft of the tablet device; and a base portion having a rotatable connecting head portion for releasably connecting the frame portion to a pedestal portion via a locking structure disposed on a forward face of the rotatable head portion to enable the frame portion to be removed from the base portion while retaining the tablet device, the rotatable connecting head portion carrying a second universal adaptor arranged on the forward face of the rotatable connecting head portion to create a detachable interface connection point for at least communicatively coupling the second universal adaptor to the second connector fitting of the first universal adaptor, aft of the tablet device and at a position adjacent to the forward face of the rotatable connecting head portion, while the frame portion is releasably connected to the rotatable connecting head portion.

* * * * *